Feb. 15, 1949.          F. M. WILLIAMSON          2,461,795
                     COMPOUND ANGLE COMPUTER
Filed Feb. 1, 1945                              2 Sheets-Sheet 1

INVENTOR.
Floyd M. Williamson
BY
A. E. Wilson.
ATTORNEY.

Feb. 15, 1949.　　　F. M. WILLIAMSON　　　2,461,795
COMPOUND ANGLE COMPUTER

Filed Feb. 1, 1945　　　2 Sheets-Sheet 2

INVENTOR.
Floyd M. Williamson
BY
ATTORNEY.

Patented Feb. 15, 1949

2,461,795

UNITED STATES PATENT OFFICE 2,461,795

COMPOUND ANGLE COMPUTER

Floyd M. Williamson, Detroit, Mich.

Application February 1, 1945, Serial No. 575,619

8 Claims. (Cl. 33—94)

This invention relates to calculating instruments, and more particularly to an instrument for mechanically computing or determining the trigonometric function of angles, or for computing an angle when one of its functions is known.

The instrument is also usable for mechanically calculating a compound angle; that is, an angle formed by the projection of two intersecting lines upon a plane which is inclined to the plane of the lines by a known angle.

The device is usable by persons unskilled in mathematics, to enable such persons to determine angles, functions of angles, and compound angles without the necessity of mathematical calculation or of reference to tables of trigonometric functions.

It is an object and feature of the invention to provide an instrument for calculating the natural trigonometric functions of an angle whose size as given in degrees or radians is known.

It is a further object of the invention to provide an instrument for computing the size of an angle when one of its trigonometric functions is known.

A further object of the invention is to provide an instrument for calculating a compound angle, as above defined, when the two angles which constitute it are known.

A further object of the invention is to provide a device of simplified construction, requiring no skill or knowledge beyond that of the skilled machinist or draftsman, which is suitable for use in the shop or drafting room, and which will accomplish the objects above stated.

Further objects and advantages of the invention will be apparent from the following description, taken in connection with the appended drawings, in which.

Figure 1:
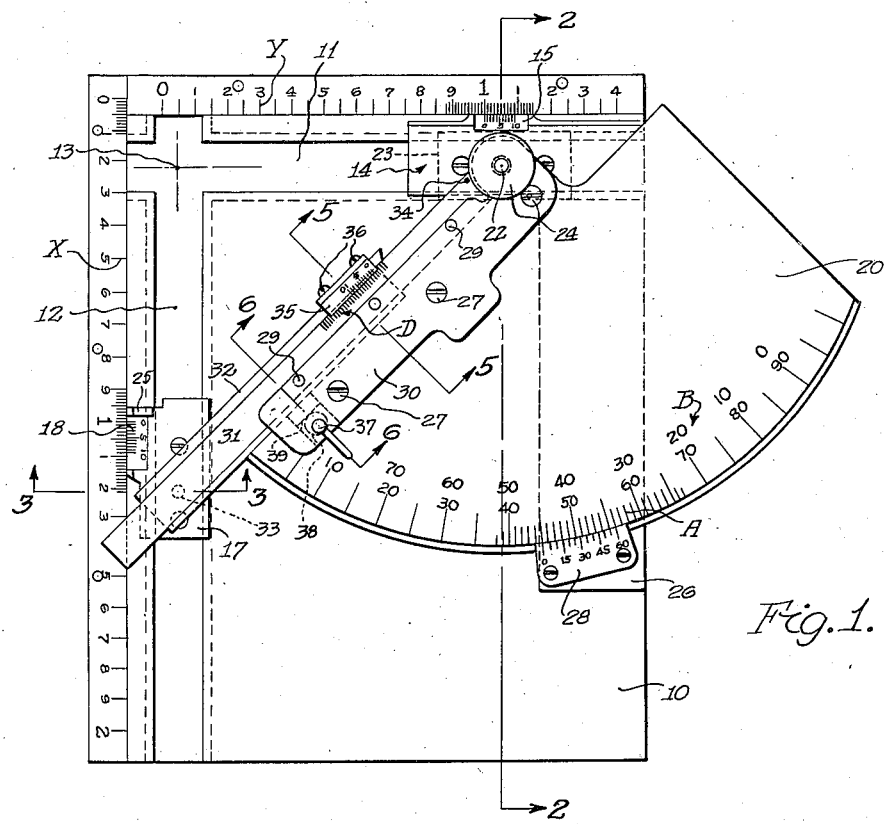
Fig. 1 is a plan view of an instrument embodying the invention.
Figure 2:
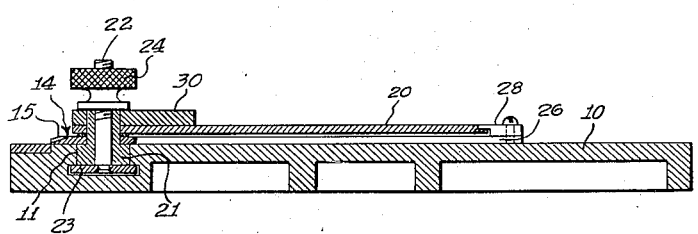
Fig. 2 is a section taken on the line 2—2 of Fig. 1.
Figure 3:
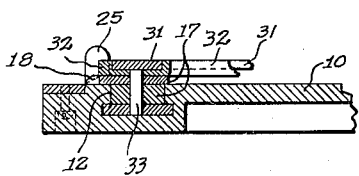
Fig. 3 is a fragmentary section taken on the line 3—3 of Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The instrument shown in the drawings comprises a rectangular base plate 10 provided adjacent two of its edges with grooved ways 11 and 12, intersecting at 13, the ways being for convenience herein designated respectively as the horizontal way and vertical way. Adjacent the ways 11 and 12 are scales Y and X, graduated arithmetically into any convenient units of length from zero to 2 or thereabouts, and into tenths and hundredths thereof.

Within the way 11 is mounted a slide 14 one edge of which is formed as a vernier 15 graduated into ten equal divisions which together equal in length nine of the smallest subdivisions of scale Y.

Within the way 12 is mounted a slide 17 one edge of which is likewise graduated as a vernier 18, the ten subdivisions of which together equal in length nine of the smallest subdivisions of the scale X.

A protractor plate 20 is pivoted to slide 14 by means of a stud 21 slidable within the way 11 and provided with a bore within which is a bolt 22 which extends through the stud, its head 23 engaging slidably in a laterally extended portion at the bottom of the way 11, while its upper end is engaged by a knurled nut 24. The nut 24 may be loosened manually to permit the slide to be moved laterally in the wall 11, and tightened to retain it in the desired position by friction between the head 23 and the plate 10.

The slide 17 is similarly related to the vertical way 12, except that, in the embodiment shown, it is retained in the desired position manually, by means of an ear 25 formed at one end of the vernier 18.

The periphery of the protractor plate 20 is calibrated in degrees of arc from zero to 90° or more, measured on an arc described with the bolt 22 as a center. These calibrations constitute the angular scale A, which registers an angle equal to the angle 13—33—22. The scale may be further subdivided into fractions of degrees, or minutes, or the entire scale may be in radians or other units if desired. For convenience in certain operations, the scale A may also be numbered in the reverse direction, from 90° to zero, the reverse numbering being designated as scale B, which registers an angle equal to the angle 33—22—13.

The slide 14 is provided with an integral extension 26 which extends perpendicular to the Y scale, and which is provided at its lower end with a plate 28 upon which is a vernier scale graduated in minutes of arc. The smallest subdivision on the vernier may conveniently be five minutes of arc, while the smallest subdivision on the scale A may be one degree, with twelve such subdivisions on the vernier equal to eleven subdivisions on the scale A.

A retaining plate 30 is secured to the inner edge of the protractor plate 20 by means of screws 27, and carries a slide rail 31 secured to plate 30 by means of pins 29, and extending beyond the periphery of the plate 20 as shown. The rail 31 is graduated from 1.000 to 2.500 or thereabouts, to form a scale D, into units of length precisely the same as those of scales X and Y.

A groove member 32 is pivoted to slide 17 by means of a pivot pin 33 which pivotally secures the member 32 to the slide. The groove of member 32 thus forms a way, within which the rail 31 is slidable. Member 32 carries at its upper end a member 35 formed as a vernier, which is related to the scale D in the same manner that verniers 15 and 18 are related to the scales Y and X. A stop pin 34 is provided adjacent the end of rail 31 against which the member 35 abuts when the scale D reads 1.000, for convenience in setting this value. The member 35 is secured to member 32 by any suitable means such as screws 36.

There is thus provided means for indicating the distances between points 13 and 22, 13 and 33, and 22 and 33, which form the legs and hypotenuse of a right angle triangle, and also for indicating the angles of said triangle. In each case, the indicating scale is, for convenience in manufacture, offset somewhat from the distance or angle to be indicated, but without affecting the accuracy of the indication.

Figure 6:
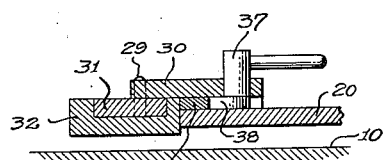
Fig. 6 is a fragmentary sectional view taken on the line 6—6 of Fig. 1.

As will be seen in Fig. 6, the plate 30 is provided with a detent or locking means to prevent movement of the rail 31 within the groove of member 32 when that effect is desired. This means comprises a crank pin 37 rotatably mounted in plate 30 and having a cam 38 at its lower end which, upon rotation of pin 37, moves a shoe 39 into frictional engagement with the lateral surface of member 32.

Figure 4:
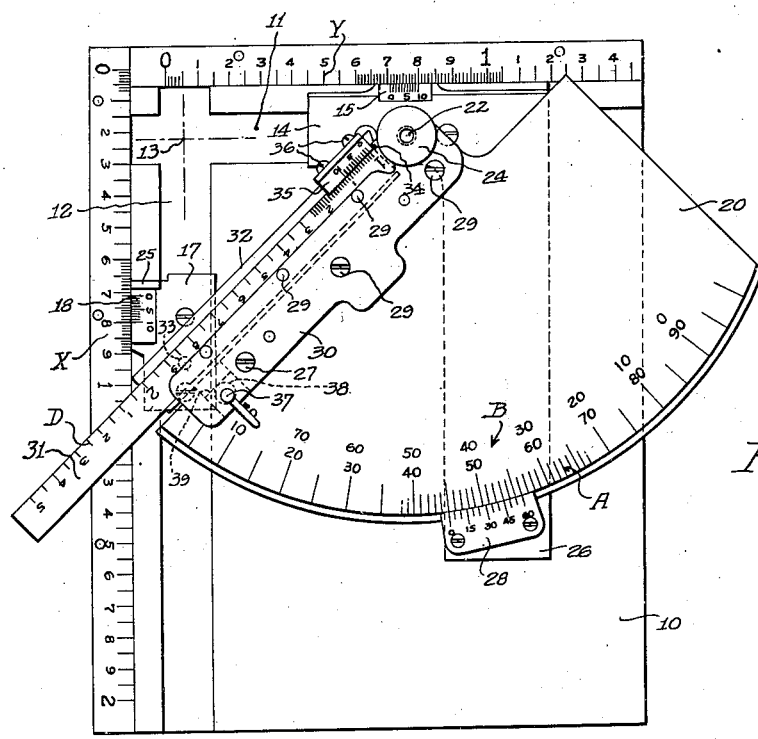
Fig. 4 is another plan view of the instrument shown in Fig. 1, but showing the device set for a different calculation.
Figure 5:
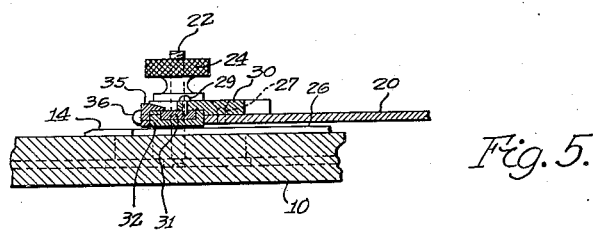
Fig. 5 is a fragmentary sectional view taken on the line 5—5 of Fig. 1.

To illustrate the operation of the device for determining the function of an angle, let it be assumed that it is desired to find the sine of the angle of 45°. The operator will first set the D scale at 1.000; that is, he will release the crank pin 37 and move the member 32 longitudinally of rail 31 until the zero mark on vernier 35 is opposite the "1" mark on the D scale, and secure these parts in that relation by setting the crank pin 37. The nut 24 being loosened, he will then move the slide 14 along its way 11 to set the protractor at 45°; that is, to set the "45" mark on scale A opposite the zero mark on vernier 28. The parts are then in the position shown in Fig. 4, and the sine of the angle 45° may then be read on the Y scale, as .707. The result must necessarily be correct because, in the position of the parts as described, and as shown in Fig. 4, the distance between bolt 22 and pin 33 is unity on the scale D, ways 11 and 12 are perpendicular to each other, and the rail 31 extends at an angle of 45° from the way 12. The distance measured on scale Y, when divided by the distance (unity) measured on the scale D, is therefore the sine of the angle of 45°. The cosine of the angle may likewise be read directly on the scale X, and in the illustration under consideration will be found to be .707.

As a further illustration, let it be assumed that it is desired to find the secant of the angle of 30°. The operator will release the crank pin 37, and set the X scale at 1.000, retaining the vernier 18 against movement by means of the ear 25. He will then set the A scale at 30°. The secant may then be read on the D scale, which in this instance will be 1.155. The tangent may at the same time be read on the Y scale, and will be found to be .577.

If it is desired to find, for example, the angle whose sine is a given value, say .500, the operator will set the value .500 on the Y scale, and will set the value 1.000 on the D scale. The angle may then be read on the A scale and will be found to be 30°. The cosine of the angle may at the same time be read on the X scale and will be found to be .866.

Let it now be assumed that an angle and the length of one leg of a right angle triangle are known, and it is desired to find the length of the hypotenuse and of the other leg. The operator releases crank pin 37, and sets, say on the Y scale, the length of the leg whose length is known, let us say, to be 1.000; he then moves slide 17 to a point where the known angle of say, 45°, appears on the A scale. The parts are then in the positions shown in Fig. 1, and the length of the other leg of the triangle may be read on the X scale, as 1.000; and the length of the hypotenuse may be read on the D scale as 1.414. If the given dimensions are in quantities which are too large to be set on the several scales of the instrument, they may be divided by ten or any power thereof; or if such division would make the quantities too small for convenient reading, they may be multiplied or divided by a suitable coefficient to bring them to workable size; the result, if in linear units, will then be correspondingly multiplied or divided by the same coefficient to give the correct result.

The device thus far described therefore offers a quick and facile solution to a type of problem which frequently arises in the machine shop or drafting room. Thus, if a hole is to be drilled through a metal plate 1" in thickness, at an angle of 30° from the vertical (or from a line normal to the surface of the plate) it may be desirable, for purposes of inspection or otherwise, to know the distance between one end of the drilled hole and a line normal to the surface of the plate and passing through the other end of the hole. If the thickness of the plate is 1.234 inches, the required distance can be found mathematically, but to do so will require the use of trigonometric tables plus pencil and paper. The solution by means of the instrument of the present invention may be arrived at quickly and simply by setting the value 1.234 on the X scale, and 30° on the A scale, and reading .713 on the Y scale. The length of the hypotenuse, which is the actual length of the hole to be drilled, may also if desired be read from the D scale, and will be 1.425. Alternatively, since it is more convenient to set the X scale last, the operator may set the value 1.234 on the Y scale, and 30° on the B scale, and then read the desired distance, .713, on the X scale, and 1.425 on the D scale.

If it is desired to find the value of the angle whose tangent is .713 divided by 1.234, the operator sets the value .713 on the Y scale and 1.234 on the X scale, and reads the angle value, 30°, on the A scale.

The instrument may also be used to compute compound angles, in the following manner. Let it be assumed that two lines intersect at an unknown angle in a plane which is inclined 30° from a vertical plane, and that the projection of these lines upon the vertical plane forms an angle of 10°. To find the unknown angle, herein designated a compound angle, the operator will loosen crank pin 37, set the Y scale at 1.000, set the nut 24, and set the protractor plate at 10° on the B scale. The tangent of 10°, which is .176, can then be read on the X scale. The operator will then move the protractor to 30° on the B scale, and read the secant of 30°, which is 1.155, on the D scale. The crank pin 37 is then set with the parts in this position, the nut 24 is loosened, and slide 17 moved to its uppermost position, wherein a reading of 0.000 is obtained on the X scale. The reading on the Y scale will then be 1.155, the secant of 30°. The nut 24 is then set to retain this reading, crank pin 37 is then released, and slide 17 moved downward until the tangent of 10°, which is .176, is obtained on the X scale. The desired angle may then be read on the B scale, and will be found to be 8°41'.

The practical application of this type of instrument to certain types of problems is more fully described in my copending application, Serial No. 575,620, filed February 1, 1945. It is contemplated that the various features disclosed in said copending application may where desirable be incorporated in the device of the present application.

I claim:

1. A computing device comprising a base having calibrated intersecting grooved ways forming a right angle, a slide movable in each of said ways and having registering means cooperating with the calibrations of the ways to indicate the positions of said slides, a first member pivoted to one of said slides, a second member pivoted to the other of said slides and connected in telescoping relation to said first member, and indicating members fixed respectively to said other slide and said second member for indicating the angular position of said second member.

2. A computing device comprising a rigid base having intersecting grooved ways forming a right angle, slides movable in said ways, a grooved member pivoted to one of said slides, a second member pivoted to the other of said slides and slidable in the groove of said first mentioned member, and indicating members fixed respectively to said other slide and said second member for indicating the angular position of said second member.

3. The invention defined in claim 2, comprising in addition quick releasable means for preventing sliding movement of the second member relative to the first mentioned member.

4. The invention defined in claim 2, comprising in addition quick releasable cam means for preventing relative movement between the second member and the first mentioned member.

5. A computing device comprising a rigid base having formed therein intersecting graduated ways extending perpendicularly to each other, a slide non-rotatably slidable in each of said ways and having indicating means thereon cooperating with the graduations on its respective way, an extensible member having its ends pivotally connected to said slides, means for indicating the distance between said ends, a protractor carried by said extensible member, and indicating means fixed to one of said slides and cooperating with said protractor to indicate the angle between said extensible member and one of said ways.

6. A computing device comprising a rigid base having formed therein two intersecting graduated ways extending at a fixed angle to each other, a slide non-rotatably slidable in each of said ways and having indicating means thereon cooperating with the graduations on its respective way, an extensible member formed of two telescoping parts each having an end pivotally connected to one of said slides, cooperating means on said parts indicating the distance between said ends, a protractor carried by one of said parts, and indicating means fixed to the slide to which said last-mentioned part is pivotally connected and cooperating with said protractor to indicate the angle between the extensible member and the way in which said last-mentioned slide is slidable.

7. The invention defined in claim 6, comprising in addition means for securing one end of said extensible member against rotation relative to its slide while permitting sliding movement of said slide in its way.

8. A computing device comprising a rigid base member having formed therein two intersecting ways extending perpendicular to each other, graduations on said base member adjacent said ways, two slides non-rotatably slidable in the respective ways, indicating means on the slides cooperating with the graduations on the base member, a hypotenuse member formed of two parts slidable longitudinally of each other, each of said parts having an end pivotally connected to one of said slides, means for preventing sliding movement of said parts relative to each other, a protractor carried by one of said parts, and indicating means fixed to one of said slides and cooperating with said protractor to indicate the angles between the protractor and the ways.

FLOYD M. WILLIAMSON.

REFERENCES CITED

The following references are of record in the file of this patent:

UNITED STATES PATENTS

| Number | Name | Date |
|---|---|---|
| 614,985 | Ruffin | Nov. 29, 1898 |
| 973,584 | Thomas | Oct. 25, 1910 |
| 1,302,590 | Reazor | May 6, 1919 |
| 1,965,062 | Wellington | July 3, 1934 |
| 1,999,105 | Milla | Apr. 23, 1935 |
| 2,256,445 | Wiedermann | Sept. 16, 1941 |

FOREIGN PATENTS

| Number | Country | Date |
|---|---|---|
| 109,283 | Great Britain | Aug. 30, 1917 |
| 279,681 | Great Britain | Nov. 3, 1927 |
| 406,488 | Great Britain | Mar. 1, 1934 |